United States Patent
Rubin (10) Patent No.: US 9,449,280 B2
(45) Date of Patent: Sep. 20, 2016

(54) SYSTEM AND METHOD FOR MINING LARGE, DIVERSE, DISTRIBUTED, AND HETEROGENEOUS DATASETS

(71) Applicant: Stuart Harvey Rubin, San Diego, CA (US)

(72) Inventor: Stuart Harvey Rubin, San Diego, CA (US)

(73) Assignee: The United States of America as represented by Secretary of the Navy, Washington, DC (US)

(*) Notice: Subject to any disclaimer, the term of this patent is extended or adjusted under 35 U.S.C. 154(b) by 230 days.

(21) Appl. No.: 14/316,439

(22) Filed: Jun. 26, 2014

(65) Prior Publication Data

US 2015/0178636 A1 Jun. 25, 2015

Related U.S. Application Data (63) Continuation-in-part of application No. 13/734,669, filed on Jan. 4, 2013, now Pat. No. 9,299,025, which is a continuation-in-part of application No. 12/755,268, filed on Apr. 6, 2010, now Pat. No. 8,447,720.

(51) Int. Cl.
*G06N 7/02* (2006.01)
*G06N 5/02* (2006.01)
*G06N 5/04* (2006.01)

(52) U.S. Cl.
CPC .............. *G06N 7/02* (2013.01); *G06N 5/025* (2013.01); *G06N 5/048* (2013.01)

(58) Field of Classification Search
None
See application file for complete search history.

(56) References Cited

U.S. PATENT DOCUMENTS

| | | | | |
|---|---|---|---|---|
| 5,412,756 A * | 5/1995 | Bauman | ............... | G06N 5/043 706/45 |
| 5,715,468 A * | 2/1998 | Budzinski | ............... | G06F 17/27 704/9 |
| 7,047,226 B2 | 5/2006 | Rubin | | |
| 7,313,573 B2 * | 12/2007 | Leung | ............... | G05B 23/0275 |
| 7,730,020 B2 * | 6/2010 | Leung | ............... | G05B 23/0275 707/600 |

(Continued)

OTHER PUBLICATIONS

Rajesh Kumar, "An Ontology-based Knowledge Management Framework for Heterogeneous Verification," PhD Thesis, Carnegie Mellon University, Apr. 2007.*

(Continued)

*Primary Examiner* — Kakali Chaki
*Assistant Examiner* — Fuming Wu
(74) *Attorney, Agent, or Firm* — SPAWAR Systems Center Pacific; Kyle Eppele; J. Eric Anderson (57) ABSTRACT

A method for directed mining of a heterogeneous dataset with a computer comprising: populating a rule base with known rules, wherein each rule has a context and a situation; populating a case base with known cases, wherein each case has a context and a situation, and wherein the case base is partitioned from the rule base; ascribing a natural language semantics to predicates of the known cases and rules; randomly transforming the known rules and the known cases to form new rules by extracting a maximum number of common predicates; segmenting the rules and the cases on the basis of shared predicates without making distinction between context and situation predicates; abducing new knowledge from the dataset by fuzzily matching the context of a new rule to a situation the new rule does not cover; and issuing a query to a user to supply missing predicates of the fuzzy match.

14 Claims, 2 Drawing Sheets

(56) References Cited

U.S. PATENT DOCUMENTS

| | | | |
|---|---|---|---|
| 7,831,439 B1* | 11/2010 | Bryar | G06Q 10/00 235/381 |
| 7,925,605 B1 | 4/2011 | Rubin | |
| 8,073,804 B1 | 12/2011 | Rubin | |
| 8,103,600 B1 | 1/2012 | Rubin | |
| 8,117,147 B1 | 2/2012 | Rubin | |
| 8,176,031 B1 | 5/2012 | Rubin | |
| 8,250,022 B1 | 8/2012 | Rubin | |
| 8,280,831 B1 | 10/2012 | Rubin | |
| 8,285,728 B1 | 10/2012 | Rubin | |
| 8,315,958 B1 | 11/2012 | Rubin et al. | |
| 8,447,720 B1* | 5/2013 | Rubin | G06N 5/025 706/46 |
| 8,489,648 B1 | 7/2013 | Rubin | |
| 8,768,869 B1 | 7/2014 | Rubin | |
| 9,299,025 B1* | 3/2016 | Rubin | G06N 5/02 |
| 2007/0022078 A1* | 1/2007 | Gupta | G06N 5/00 706/59 |
| 2007/0094216 A1* | 4/2007 | Mathias | G06N 5/04 706/52 |
| 2009/0144075 A1* | 6/2009 | Flinn | G06N 5/048 705/318 |
| 2009/0167763 A1* | 7/2009 | Waechter | G06T 15/06 345/426 |
| 2009/0186535 A1* | 7/2009 | Sullivan | B60F 3/0007 440/6 |
| 2015/0178636 A1* | 6/2015 | Rubin | G06N 7/02 706/8 |

OTHER PUBLICATIONS

Portinale et al., "ADAPtER: An Integrated Diagnostic System Combining Case-Based and Abductive Reasoning," Proc. First International Conference on Case-Based Reasoning-ICCBR 95, Sesimbra, Lecture Notes in Artificial Intelligence 1010, pp. 277-288, 1995.*

Kornfeld, Sara; Final Report; Patrick Henry High School; Aug. 2013.

Rubin, S., et al., "Learning Using an Information Fusion Approach", Proc. of the ISCA Int'l Conference on Intelligent and Adaptive Systems, Nice, 2004.

Chaitin, G.J., Randomness and Mathematical Proof, Sci. Amer., vol. 232, No. 5, pp. 47-52, 1975.

Zadeh, L.A., "From Computing with Numbers To Computing with Words . . . ," IEEE Trans. Ckt. and Systems, vol. 46, No. 1, pp. 105-119, 1999.

Rubin, S.H., et al., "On the Role of Informed Search in Veristic Computing", Proc. 2001 IEEE Int. Conf. Syst., Man, Cybern., pp. 2301-2308, 2001.

Rubin, S.H., et al., "KASER: Knowledge Amplification by Structured Expert Randomization", IEEE Trans. Syst., Man, Cybern.: Part B, vol. 34, No. 6m Dec. 2004, pp. 2317-2329.

Rubin, S.H., "On randomization and discovery", Information Sciences, vol. 177, pp. 170-191, Jan. 2007.

Solomonoff, "A Formal Theory of Inductive Inference", Information and Control, vol. 7, pp. 1-22, 224-254, 1964.

Godel, "On formally undecidable propositions of Principia Mathematica and related systems 1", 1931.

Barker et al., "A Knowledge Acquisition Tool for Course of Action Analysis", American Association for Artificial Intelligence, Intelligence, 2003.

Rubin, Lee, Pedrycz, and Chen; Modeling Human Cognition Using a Transformational Knowledge Architecture; IEEE 978-1-4244-2173-2/08; 2008.

Rubin, Rush, and Ceruti; Application of Object-Oriented Design to Knowledge Amplification by Structured Expert Randomization (KASER); IEEE Proceedings of the Seventh International Workshop on Object-Oriented Real-Time Dependable Systems (WORDS 2002); 2002.

Rubin; A System of Systems (SoS) Design Amplifier; IEEE Proceedings of the Fourth International conference on Machine Learning and Applications (ICMLA'05); 2005.

Rubin and Strom: On the Associative Mining of Big Data for Creative Decision-Making; CATA-2013, 28th International Conference on Computers and Their Applications 2013, Hawaii, Mar. 4-6, 2013.

Unpublished U.S. Appl. No. 13/734,669; Case-Based Reasoning System Using Case Generalization Method; submitted Jan. 4, 2013; Navy Case 101366.

* cited by examiner

SYSTEM AND METHOD FOR MINING LARGE, DIVERSE, DISTRIBUTED, AND HETEROGENEOUS DATASETS

CROSS-REFERENCE TO RELATED APPLICATION

This application is a continuation-in-part of prior U.S. application Ser. No.: 13/734,669, filed 4 Jan. 2013, titled "Case-Based Reasoning System Using Case Generalization Method" (Navy Case #101366); which is a continuation-in-part of U.S. application Ser. No. 12/755,268, U.S. Pat. No. 8,447,720, issued 21 May 2013, titled "Adaptive Case-Based Reasoning System Using Dynamic Method for Knowledge Acquisition" (Navy Case #100222); both of which applications are hereby incorporated by reference herein in their entirety for their teachings.

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101517.

BACKGROUND OF THE INVENTION

There is an outstanding problem in artificial intelligence of how to apply commonsense knowledge to transform domain-specific knowledge so as to adapt it to current problem-solving needs as defined by a supplied context. Expert systems are currently used for the application of domain-specific knowledge for the solution of complex problems. However, they are brittle, cannot get too large or they become too costly to maintain, and cannot effectively apply commonsense reasoning.

SUMMARY

Described herein is a method for directed mining of a heterogeneous dataset with a computer. The first step provides for populating a rule base with known rules, wherein each rule has a context and a situation. The next step provides for populating a case base with known cases, wherein each case has a context and a situation, and wherein the case base is partitioned from the rule base. The next step provides for ascribing a natural language semantics to predicates of the known cases and rules. The next step provides for randomly transforming the known rules and the known cases to form new rules by extracting a maximum number of common predicates. The next step provides for segmenting the rules and the cases on the basis of shared predicates without making distinction between context and situation predicates. The next step provides for abducing new knowledge from the dataset by fuzzily matching the context of a new rule to a situation the new rule does not cover. The last step provides for issuing a query to a user to supply missing predicates of the fuzzy match.

The method for directed mining of a heterogeneous dataset described herein may also be described as comprising the following steps. Step one provides for dividing the dataset into domain-specific segments, each segment stored on a separate processor, wherein each segment comprises productions that are partitioned into rule and case bases, and wherein each production comprises a context predicated by a situation and vice versa. Step two provides for creating a shared symbolic predicate interpretation lookup table in each segment that includes primitive symbols and their sequences, context, and situation interpretations. Step three provides for searching a segment by selecting a given production and transforming it by replacing its context with predicate equivalents and then searching the group of segments for a situation covered by the transformed context. Step four provides for defining random and symmetric quantums for each processor, wherein the random and symmetric quantums represent the exclusive time spent in performing random and symmetric searches respectively in a most-recently-successful rule discovery, per processor. Step five provides for initializing both quantums in each processor to the same value so as to preserve fairness and prevent thrashing. Step six provides for terminating search prior to quantum expiration if no situation is found to be applicable. Step seven provides for alternating search in each processor between symmetric and random search proportionately favoring the type of search having the shorter quantum, wherein ties are broken at uniform chance. Step eight provides for updating the quantums if the transformed context covers, or fuzzily matches upon interrupt, a given situation in one of the processors and if a likelihood of the combination of the transformed context and the given situation is within a possibility squelch, wherein the possibility of the combination of the transformed context and the given situation is the product of the possibility of each transform in the combination. Step nine provides for adding the transformed context and the covered situation as a new rule to the logical head of the rule base of those segment(s) having maximal cohesion subject to relation. Step ten provides for taking the cases and/or rules having the highest one-step possibilities, and issuing questions/queries to a user as to the status of their unmatched situational predicates if, upon timer/quantum interrupt, a complete covering of a situation in a segment is not found. Step eleven provides for expunging all cases and rules that are found to be in error. Step twelve provides for expunging the least-recently-used (LRU) cases and rules in a segment to free storage space as necessary. Step thirteen provides for maintaining in each segment a local stacking mechanism for excluding cycles in transformation by checking for duplicate states whenever a transformed context and transform is to be stacked. Step fourteen provides for checking the final results of locally acyclic and successful transformations against the contents of every segment to insure that it is unknown. Step fifteen provides for moving to the tail of its containing segment any transform, which gave rise to a duplicate state. Step sixteen provides for terminating the stacking mechanism upon interrupt, or failure to find a randomization within cumulative likelihood within the possibility squelch. Step seventeen provides for providing the acyclic contexts, transformations, and transformed contexts, on the segment stacks, as sequential metaphorical explanations.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
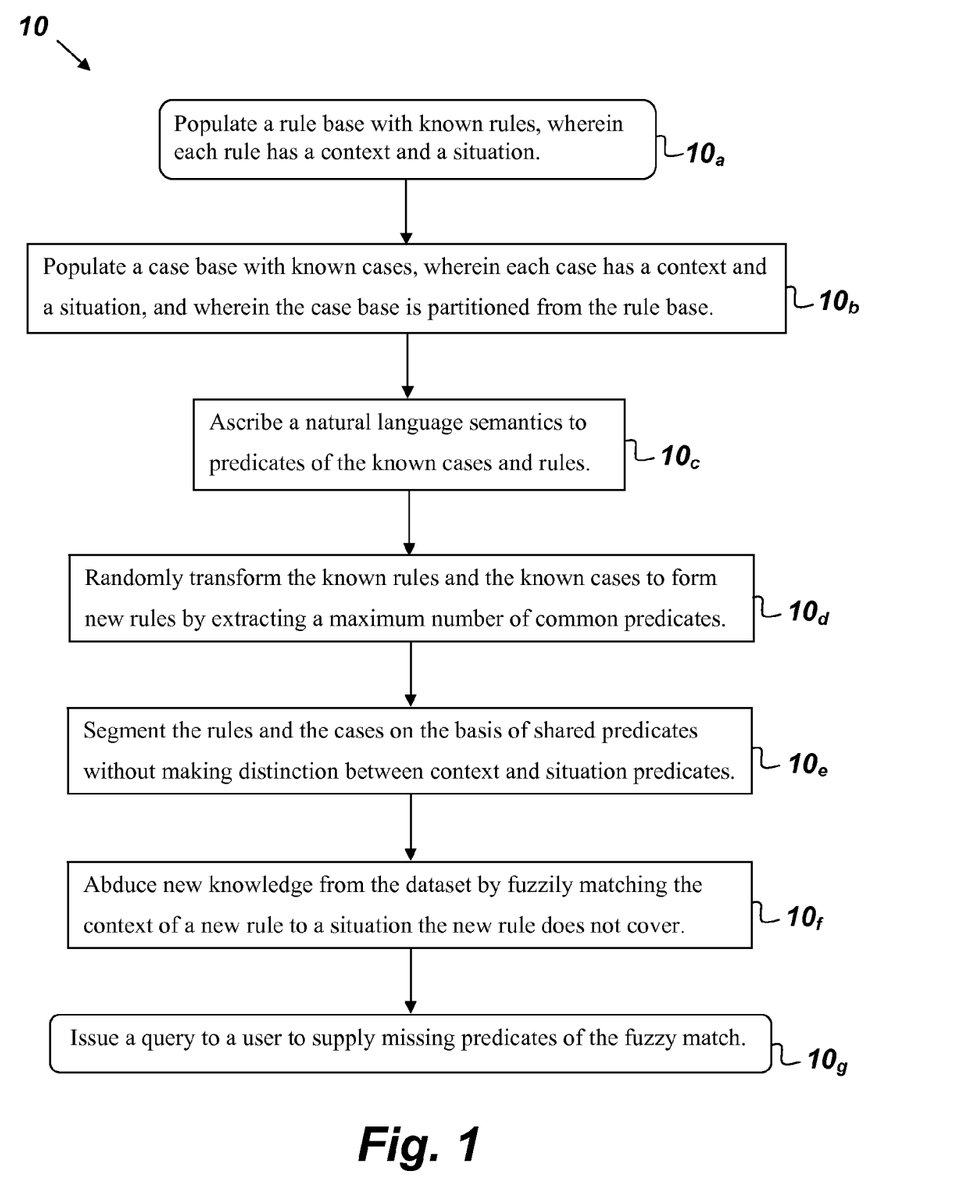
FIG. 1 is a flowchart of a method for directed mining of a heterogeneous dataset.

FIG. 1 is a flowchart for a method 10 for directed mining of a heterogeneous dataset comprising, consisting of, or consisting essentially of steps $10_a$ through $10_g$. Step $10_a$ provides for populating a rule base with known rules, wherein each rule has a context and a situation. Step $10_b$ provides for populating a case base with known cases, wherein each case has a context and a situation, and wherein the case base is partitioned from the rule base. Step $10_c$ provides for ascribing a natural language semantics to predicates of the known cases and rules. Step $10_d$ provides for randomly transforming the known rules and the known cases to form new rules by extracting a maximum number of common predicates. Step $10_e$ provides for segmenting the rules and the cases on the basis of shared predicates without making distinction between context and situation predicates. Step $10_f$ provides for abducing new knowledge from the dataset by fuzzily matching the context of a new rule to a situation the new rule does not cover. Step $10_g$ provides for issuing a query to a user to supply missing predicates of the fuzzy match.

Method 10 allows antecedent sets and consequent sequences to have distinct interpretations (i.e., duality), which enables the iterative randomization of knowledge. Method 10 also provides for the automatic segmentation of all knowledge for use in conjunction with massively parallel processors. This increases the practical density of knowledge, which may be stored in a finite memory space by expunging least-recently-used (LRU) compatible knowledge. Moreover, method 10 provides a possibility squelch for selecting among competing actions, question asking, and fuzzy predicate matching for the definition of a synthetic intelligence. Knowledge may be partitioned on the basis of whether it is a case, or a rule. Method 10 can Method 10 benefits from a heuristic framework that learns to direct the mining of structured and unstructured datasets and converges on providing knowledge arrived at by process of abduction from prior data. This knowledge necessarily includes features, objects, entities, activities, patterns of interest, and relationships. Abduction allows for the generation of questions/queries to extract missing predicate information. A possibility metric may be provided for each production which cumulatively tracks the similarity of the context and a selected production's antecedent. Each context may be associated with a minimum possibility metric so that no production below threshold may fire. Possibilities of error may be used to incorporate uncertainty and imprecision. The rule space converges on making the proper decisions.

Often, the supplied data is missing key attributes (i.e., incompleteness). These attributes are needed to increase the certainty of a decision output. Method 10 can acquire these attributes by process of abduction. All, none, or some of these attributes need to be validated, invalidated, or not decided upon (by default) by the user and/or an external system. Such feedback will amplify system capabilities. This follows because as the rule base grows, the potential for generalization and abduction grows too. Random and symmetric searches may be integrated to ensure broad coverage of the search space. The transformed context may be fuzzily matched to a situation, which it does not cover. This may be done to increase the systems predictive capability. Contradictory data may be resolved through the use of heuristics.

Method 10's methodology for rule mining can be applied to mining rules that direct the mining of other rules (i.e., including the mining of the mining rules, or self-reference). This is needed for scalability. Cases and rules are stored in segments so as to maximize their coherency (i.e., domain-specificity) across parallel processors. Less useful knowledge is expunged in keeping with this policy. This defines a dynamic distributed model over several (numerous) integrated knowledge bases.

Healthcare is just one of many industries that are using or will make use of tools, such as method 10 that can rapidly analyze information. Emergency preparedness, terrorism detection, and fraud detection are all likely to follow quickly. As described below, method 10 may be used to deal with a plethora of heterogeneous data from multiple sources. Knowledge begets knowledge. Thus, data mining method 10 is directed (the colloquial term for knowledge-based mining). The focus of method 10 is to techniques using abduction for acquiring knowledge for directed mining. This is because this technique applies to the randomization of cases into rules just as it applies to the mining of datasets. It is thus self-referential and scalable as a consequence.

The knowledge serving directed mining is acquired by method 10 through the use of heuristics. Heuristics are needed to best learn from massive data that may be uncertain, incomplete, imprecise, and/or contradictory. The use of abduction for the extension of knowledge bases is fundamental to the mining of large datasets—independent of the number of assigned parallel processors. This follows again because parallel processors can at best reduce computational time by a linear factor; whereas, the complexity inherent to undirected mining grows exponentially with the number of variables. Method 10 defines an adaptive self-referential system, which is measurably faster precisely because heuristics need not be exact.

Theoretically, it may be proven that a particular model for machine learning is more powerful than another because it is capable of representing more complex curves or functions. While this may be true (e.g., for neural networks having hidden layers), in practice one may be surprised that a learning system using a theoretically less powerful representation may yield better predictions than one with a potentially stronger representation. Even the fastest neural networks, using the k-nearest neighbor (KNN) or radial basis function (RBF) models realized in expandable hardware, cannot scale to massive datasets. This is because the shape of the decision space, modeled as examples, requires potentially intractable iterative re-learning. This, in turn, opens the door for symbolic and heuristic methods—including those based on analogy, and in general those for which search results are inadmissible. Often heuristic power can be gained at the expense of admissibility (i.e., the guarantee of finding an optimal solution whenever one exists).

All knowledge can be characterized as random or symmetric. Randomization reduces data or knowledge to a more general form. Not only is this form more reusable; but as a consequence, it can be more widely applied in the transformation of knowledge to create symmetric (analogical) knowledge. This will be shown below. The acquisition of random or symmetric knowledge serves to increase the scope of the knowledge base. This serves to increase its latent intelligence as well. Furthermore, it follows that since all knowledge can be characterized as some dynamic combination of randomness and symmetry that the system proposed herein for knowledge generation has the theoretical potential to emulate human creativity and thought.

There are machine learning techniques that work in the small, but do not scale. The reason is that in the small one can afford the luxury of performing exhaustive or near exhaustive search. However, as the dataset size grows linearly, the complexity of mining it grows exponentially. Thus, parallel processing is never a suitable hedge here. Only knowledge can offset the rapidly growing complexity and that is why directed mining methods, appropriate for the processing of massive datasets, are needed.

Once you setup specific conditions for the qualifier, you essentially render it domain specific. Sometimes these conditions can be very subtle. Consider for example, "Some clocks don't keep accurate time." This differs from, "There exists clocks, which don't keep accurate time." In the latter, satisfaction of the "there exists" clause allows flexibility in the definition of "accurate". However, in the former, such flexibility is not available because the scope of "some" is domain-specific. Does accuracy refer to minutes, seconds, or microseconds in the case of atomic clocks? One can't know because this is domain-specific knowledge. The only way to acquire knowledge with scale is to make the search for it knowledge-based, self-referential, and inadmissible. This illustrates three fundamental (yet generally unrecognized) shortcomings of the predicate calculus for which method 10 offers remedy.

Data embodies facts and relationships, which need to be mined with minimal chance of error. The knowledge-based component of a directed mining operation likewise needs to be mined with minimal chance of error. The mining knowledge and the applicative domain knowledge are just different instances of knowledge. Method 10, described in detail bellow, applies equally well to both, where the former guides the mining of the latter. Furthermore, the mining knowledge can apply to itself to accelerate learning of the application domain.

The application domain may be broadly characterized. It may consist of small datasets of any type. More importantly, it may also comprise massive distributed heterogeneous datasets, which embed nuggets of knowledge. These nuggets are more general than the dataset(s) from which they are derived. They form loss or lossless randomizations. Loss randomizations typically achieve the greatest compression of information, but may contradict more or less of the associated data. Lossless randomizations are simply more compact than the associated data; but, they may not be in contradiction with any of it.

Embodiments of method 10 allow for loss randomization. Loss may occur in the computation of the possibility for use by the inference engine in matching the nearest cases and rules—see below. A loss randomization may become lossless if all missing predicate information is retrieved through question/query. The meteorological and oceanographic (METOC) domain of weather prediction is used below to illustrate method 10. This is done both to enhance the clarity of exposition as well as to minimize any unfamiliarity with the domain on the part of the reader. It is done without loss of generality in the results. However, it is to be understood that method 10 may be applied to any heterogeneous dataset and is not limited to the METOC domain.

Method 10 may utilize a learning, natural-language-processing system such as the one disclosed in U.S. Pat. No. 8,447,720, which is referred to hereafter as the '720 system. The '720 system can learn to map heterogeneous data onto generalized qualitative descriptors. For example, "the barometer fell by 1.3 inches of mercury in the last hour," might be mapped to, "the barometer is falling very fast". Similarly, method 10 may utilize the '720 system, or its equivalent, to learn to map the text of mission objectives onto a hierarchical feature set input so as to replace the current alternative. This involves using an expert system to map text to a sequence of context-sensitive tokens. A case-based reasoning system can then learn to map this to a set of context-free tokens. Method 10 provides empirical results on how to translate natural language into a form that a qualitative learning system can use and vice versa back out.

Suppose that one has heterogeneous dataset(s), which are iteratively mapped by a trained '720 system (or equivalent) to yield the following generalized qualitative descriptors. Let, $b\updownarrow$=barometer rising/falling; c=cloudy; f=freezing; w=warm; p=precipitation; r=rain; s=snow; and, 1=clear. Each predicate has a duality in the sense that it has two (possibly distinct) interpretations—as a Boolean predicate and set member if used on the left-hand side (LHS) and as a sequential action if used on the right-hand side (RHS) of the implication (See Table 1 below). Note that $b\downarrow b\uparrow \to \emptyset$ (i.e., a domain-specific interpretation) and that $b\downarrow\downarrow$ is interpreted to mean that the barometer is falling very fast and similarly $b\uparrow\uparrow$ is interpreted to mean that the barometer is rising very fast—for an embedded qualitatively fuzzy representation. Capital letters on either side are used, as in grammar theory, to represent non terminals. Non terminals can represent arbitrarily complex concepts. Terminals are represented by lowercase letters.

Predicate combinations and sequences may also be ascribed meanings The most-specific predicate sequences are first to be parsed. Table 1 provides a few examples. The user enters the context and the system replies with the RHS(s) along with a computed possibility of error. The entered context may or may not appear to be covered by any knowledge-based transformations. Therein may be found the power of context-sensitive learning. Type 0 transformations can do amazing things given the opportunity for interaction. Such interaction requires time for search and must be directed by knowledge to scale successfully.

TABLE 1

Sample Predicate Semantics

| Minimal Symbols | Set (LHS) Interpretation | Sequence (RHS) Interpretation |
| --- | --- | --- |
| $b\downarrow\downarrow 1$ | A storm is unexpectedly approaching. | The barometer is rapidly falling and it's clear. |
| p p w | It's precipitating hard and it's warm. | It's raining cats and dogs. |
| p r | It's pouring. | It's pouring. |

For purposes of method 10, one may take cases to be at least as specific as rules, which (like all rules) may allow for generalization. Generalization is done to increase applicability. It is accurate to state that, "Knowledge should be as general as possible, but no more so". Consider the following pair of weather cases (1).

$$C1: b\downarrow cw \to r$$

$$C2: b\downarrow cf \to s \quad (1)$$

One can randomize C1 and C2 by extracting the maximum number of predicates, which they have in common into a rule. The semantics need not be known in order to perform this operation. Transformation (2) may be assumed to already exist in the bases in practice. Thus, $$R1: b\downarrow c \to \quad (2)$$

Note that although transformations point to the right, it is understood that they are bidirectional. This is a result of the allowance for Type 0 expansions and contractions. Furthermore, each direction of transformation incurs independent logical movement. Next, one may proceed to randomize C1 and C2 by substitution of R1 into them with the result:

$$R2: pw \rightarrow r$$

$$R3: pf \rightarrow s \quad (3)$$

At this point, assume that the system acquires the case:

$$C3: b \uparrow c \rightarrow 1 \quad (4)$$

Next, it is supplied with the context, $b \downarrow 1$, which has no literal match in the case or rule bases thus far. However, by pre-multiplying both sides of transformation (4) by $b \downarrow$ one may obtain:

$$R4: b \downarrow 1 \rightarrow b \downarrow b \uparrow c(id) \rightarrow c \quad (5)$$

Furthermore, $$R5: p \rightarrow b \downarrow c(R1) \rightarrow b \downarrow \downarrow 1(R4) \quad (6)$$

R5 makes conceptual sense. One can substitute R5 for R1 in all candidate derivations.

Notice that any rule, which logically follows, can be derived given sufficient search time without a need to store intermediary rules. However, this practice will not successfully scale to massive datasets. Here, not only are rules often needed in real time; but, the complexity of their interaction can grow exponentially. Method 10 allows for unpromising candidate interactions to be pruned and the remainder saved—at least temporarily. That is, in method 10, search control is under heuristic guidance as is explained below where it is shown that a qualitative representation enables heuristic guidance and vice versa in the abduction of knowledge.

Scalable directed miners necessarily employ large, segmented, distributed, and often heterogeneous knowledge sources. One problem solved by method 10 pertains to how to pair a context, or state vector for the current state of the salient universe, with its closest-matching situation. This situation then triggers its associated action and the entire process iterates. Method 10 utilizes a distinct qualitatively-fuzzy (loss) solution to this problem, as discussed below. Suffice it to say for the present that method 10's solution allows for fine-grained massively parallel search. The distributed directed mining of datasets of arbitrary size has no upper time-complexity bound.

The most-general (most-powerful) representational formalism for knowledge is the Type 0 grammar. This formalism is theoretically equivalent to the generalized and/or graph (GAG). Here, transformations can iterate between expansions and contractions. Most importantly, one can rarely arrive at a globally optimal solution by hill-climbing context-free solutions to complex contexts.

Heuristics may take on many different forms. Sometimes they appear as rules of thumb for use in predicting the weather say. Other times, they may appear as algorithms for use in finding metrics for ranking candidate cases. Still other times, they may appear as optronic hardware (e.g., SLMs) for the rapid summation of signals, where digital accuracy is not required. Here, heuristics take the form of any useful technique for exploiting symmetry in search.

First, search cannot be entirely random, or it will be unnecessarily slow. Similarly, it cannot be entirely symmetric, or it will be incapable of novel discovery. In method 10, the percentage of time that search is random or symmetric is dynamic and varies with the most-recent rate of success in discovering new knowledge. Method 10 utilizes two quantums. First, is the random quantum and second is the symmetric quantum. The former dynamically defines the amount of time that a processor may spend in the performance of uniform search for new knowledge. The latter dynamically defines the amount of time that a processor may spend in the performance of skewed search for new knowledge. When the allotted time for chance search (i.e., its random quantum) expires, the system (context) is switched to say symmetric search (i.e., until its symmetric quantum expires), then back to say chance search, and so on. These quantum pairs are locally and dynamically defined for each processor. Search is forcibly terminated, prior to quantum expiration, if no production is found to be applicable. The more successful modality will have the shorter quantum and will be used to kick off the search as defined in each processor. A simple example will serve to clarify this concept as follows.

Suppose that the random quantum was of two seconds duration and the symmetric quantum was of one second duration. Search time is to be allocated in inverse proportion to the most-recent time required for discovery. Thus, two-thirds of the time, on average, is to be spent exploring symmetric transformations. One-third of the time, on average, is to be spent exploring random transformations. Notice that proportionately more time is spent using the most-successful search modality and proportionately less time is spent using the less-successful search modality as dynamically defined.

Cases and/or rules may be randomized into rules as previously described. Suppose that random transformation is selected next as previously described. Here, cases and/or rules are randomly applied to the (resultant) context in an attempt to transform it into an arbitrary covering of some case and/or rule antecedent. The idea is to transform its syntax while preserving its semantics in order that it will be known by the local knowledge base segment. After the random quantum or two seconds elapses, say symmetric transformational search is selected next. This then begins anew for a symmetric quantum, or one second here. Then, if say random transformational search is selected next, processing continues for another two seconds, or until the context is successfully mapped. The mapped set must cover (or fuzzily match upon interrupt) a situation of some case and/or rule in some processor segment and have a possibility above the set noise limit, or squelch (the possibility squelch is described in further detail below).

If the context were to be successfully mapped after one more second elapses, then the random quantum is reset to three seconds. This is the sum of random transformational search times that it took to discover this transformational sequence map. Otherwise, symmetric transformational search continues for another symmetric quantum, if selected, and so on. The lower and upper bounds on quantum time definitions are determined to preserve fairness and prevent thrashing, respectively. Again, it can also be the case that no further rules can be created at this time—in which case this "idle" process is terminated by an interrupt and fuzzy predicate matching may be applied to find the best-matching case and/or rule.

Regarding random transformation and symmetric transformation, both processes share the same local list of productions with the effect that the random transformations anneal the results of the applied symmetric transformations. A similar process is sometimes used to keep neural networks from climbing strictly local hills during training. Similarly, a little random knowledge can go a long way towards enabling otherwise symmetric solutions.

Whenever a random or symmetric transform fires, it is logically moved to the head of its local list. Symmetric search progresses down from a list's logical head. In random transformation, each transform on that list has an equal chance of being selected to see if it is applicable. In symmetric transformation, the visited transform need not only be applicable, but it must reduce the distance between the context and at least one situation in the case and/or rule base. Such hill-climbing implies that the current maximum possibility (See equation (7) below) must increase over the previous maximum possibility (i.e., over at least one among all situations in the segmented bases). As a conceptual example, suppose that the context were {b↓c w}. R1 would transform this to {p w}, which covers the situation for R2 by increasing the number of matched predicates here to two. (The possibility increases from 0.25 to 1.0 as will be defined below.)

Again, the maximum possibility needs to increase after the application of each symmetric transform. This is because the time consumed if the possibility increase needed to only occur after the application of two or more sequential symmetric transforms (i.e., making it k-limited) proportionately negates the speedup otherwise afforded by symmetric search. Also, the annealing associated with random transformation serves to vary the applicable sequence. This does not sacrifice the speed characterizing symmetric search.

Moreover, the sequence of transformations can serve as a metaphorical explanation. This tells how the context was transformed to fully or partially cover some best-found situation. Indeed, one of the reasons expert systems are preferred over neural networks in practice is that they offer at least a conventional explanation subsystem. The context, transformation, and transformed context are iteratively stacked.

Method 10 provides a technique to find the maximally covered case and/or rule for a given context, which cannot be mapped to a complete covering upon timer interrupt (i.e., loss randomization). Also, the method 10 can ask questions or issue queries to determine the states of the critical missing predicates. For example, R1 maps the context, {b↓c} to p. This only partially covers the situations for R2 or R3, which are {p w} and {p f}, respectively. Here, the system may issue the query as to whether it is warm or freezing before issuing the prediction for rain or snow by firing R2 or R3, respectively. Even without this information, a closest match can be had along with an issuance of the possibility for error.

The relative possibility for a particular action with regard to a given context is defined by $$\text{possibility}(i) = \frac{|\text{context} \cap \text{situation}_i|}{|\text{context} \cup \text{situation}_i|}, \quad (7)$$

where possibility $(i) \in [0,1]$. Temporal locality is used to break ties (i.e., where the logically highest situation, in a particular segment, is deemed to best match the context). A case and/or rule must have greater than a zero possibility and exceed its squelch threshold to be applied. The possibility for the result of the application of a sequence of cases and/or rules is the product of the possibilities at each step in the sequence. The possibility is a metric for the reliability of the action produced by a given context. A transformative sequence may be selected to produce the maximal possibility. Conversely, if a particular action has more than one associated possibility, the greatest possibility is the one ascribed, since it has a preferred derivation. Possibilities can be experientially linked to likelihoods as shown in Table 2.

TABLE 2

Possibilities (P) Linked to Likelihoods

| Lower P | Upper P | Likelihood |
| --- | --- | --- |
| 1.00 | 1.00 | Certainty |
| 0.76 | 0.99 | Very Likely |
| 0.51 | 0.75 | Likely |
| 0.26 | 0.50 | Unlikely |
| 0.01 | 0.25 | Very Unlikely |
| 0.00 | 0.00 | Impossible |

Next, suppose that the complete context is given as {b↓c r}. This context is processed by the three cases in the case base and the five rules in the rule base as follows. Here, the cases and rules are codified for ease of reference and review:

$C1: b\downarrow cw \rightarrow r$ $C2: b\downarrow cf \rightarrow s$ $C3: b\uparrow c \rightarrow 1$ $R1: b\downarrow c \rightarrow p$ $R2: pw \rightarrow r$ $R3: pf \rightarrow s$ $R4: b\downarrow l \rightarrow b\downarrow b\uparrow c(C3) \rightarrow c$ $$R5: p \rightarrow b\downarrow c(R1) \rightarrow b\downarrow\downarrow l \quad (8)$$

Now, let a specific context be given by:

$$b\downarrow cr(R2) \rightarrow b\downarrow cpw(R1) \rightarrow ppw(R2) \rightarrow pr \quad (9)$$

A less complex randomization having a greater possibility, which may be discovered through parallel search, is given by:

$$b\downarrow cr(R1) \rightarrow pr \quad (10)$$

One can assume that the context (9) is maximally randomized (i.e., has the fewest predicate terms) using the given number of processors in the available timeframe. Transformation (10) illustrates the inherent necessity of (heuristic) search in finding less complex randomizations. Sometimes, a more complex randomization will result in a maximal randomization, which results in the greatest possibility.

The three case possibilities and five rule possibilities are as follows. Note that consecutive duplicate terms define a superset (more extreme) term; whereas, they are otherwise treated as in traditional set theory. Thus, {p p}∩{p}={p} and {p p}∪{p}={p p}. However, {p w p}∩{p}={p} and {p w p}∪{p}={p w}. It is helpful to observe that |{p p}|=|{p}|=1. Also, |{ ... }| refers to the cardinality of a set. For example, |{ }|=0, |{p p w}|=2, |{p p b↓c w}|=4, and |{p p w b↓c f}|=5.

As one moves to the right of transformation (9), the cumulative possibility (i.e., the product of possibilities after each transformation) is non-increasing. For example, R2 is found to have the best situational match for the transformed context {p p w} (having a one-step possibility of 1.0—see (11)). Of course, R1 would have been taken as the first and only transformation (10). Here, one may see that the search heuristic itself can be inadmissible with the same result. Thus, the best action to associate with it precipitating hard and being warm is that it's pouring (Table 1). This can be verified from transformations (9) or (10). Notice that given the context that it has rained, the methodology of method 10 has correctly concluded that it is warm by process of abduction.

Moving one final step to the right of transformations (9) or (10), one finds that R5 has the best situational match for the transformed context, {p r} (having a one-step possibility of 0.5—see (12). This follows because it has the greatest possibility among its contenders at this stage of transformation. Thus, the best causality to associate with it pouring (i.e., {p r}) is that the barometer is falling very fast and it is currently clear (i.e., (b↓↓1)). This simple hypothesis can be manually verified from the knowledge base (8). Notice that given the context that it is pouring, the method has effectively concluded that possibly the barometer was falling very fast and it was clear by process of abduction. While R5 is covered by this randomized context, the method works equally well where this is not the case.

$$
\begin{aligned}
C1: & \ \frac{|\{ppw\} \cap \{b{\downarrow}cw\}|}{|\{ppw\} \cup \{b{\downarrow}cw\}|} = \frac{|\{w\}|}{|\{ppb{\downarrow}cw\}|} = 0.25 \\
C2: & \ \frac{|\{ppw\} \cap \{b{\downarrow}cf\}|}{|\{ppw\} \cup \{b{\downarrow}cf\}|} = \frac{|\{\}|}{|\{ppwb{\downarrow}cf\}|} = 0 \\
C3: & \ \frac{|\{ppw\} \cap \{b{\uparrow}c\}|}{|\{ppw\} \cup \{b{\uparrow}c\}|} = \frac{|\{\}|}{|\{ppwb{\uparrow}c\}|} = 0 \\
R1: & \ \frac{|\{ppw\} \cap \{b{\downarrow}c\}|}{|\{ppw\} \cup \{b{\downarrow}c\}|} = \frac{|\{\}|}{|\{ppwb{\downarrow}c\}|} = 0 \\
R2: & \ \frac{|\{ppw\} \cap \{pw\}|}{|\{ppw\} \cup \{pw\}|} = \frac{|\{pw\}|}{|\{ppw\}|} = 1.0 \\
R3: & \ \frac{|\{ppw\} \cap \{pf\}|}{|\{ppw\} \cup \{pf\}|} = \frac{|\{p\}|}{|\{ppwf\}|} = 0.333 \\
R4: & \ \frac{|\{ppw\} \cap \{b{\downarrow}l\}|}{|\{ppw\} \cup \{b{\downarrow}l\}|} = \frac{|\{\}|}{|\{ppwb{\downarrow}l\}|} = 0 \\
R5: & \ \frac{|\{ppw\} \cap \{p\}|}{|\{ppw\} \cup \{p\}|} = \frac{|\{p\}|}{|\{ppw\}|} = 0.5
\end{aligned}
\quad (11)
$$

Again, as the number of applied transformations increases, the associated possibilities are non-increasing (i.e., and converging on their true values). This allows for the production of alternative actions in order of non-increasing possibilities for adjudication. These possibilities may be squelched and only those within that squelch, if any, may be predicted as being correct alternative action(s). The proper settings for the squelches are domain specific. All cases and/or rules found to be in error may be expunged and correct cases acquired, where the corrections are known. It follows that since the context is randomized at time t, any action triggered by it can similarly be randomized at the same time. This randomized pairing comprises a new rule, of potentially great utility. It is to be non-redundantly acquired at the logical head of the segment(s) having maximal cohesion (see below). The LRU cases and/or rules will be expunged to free storage space, as necessary. Here, search is focused on finding domain-specific knowledge when and where it is needed.

Notice that R1 has a possibility of 0 in (12). At first, this seems to be a contradiction because after all, the context states that it is raining. On closer examination, one may see that the reason for this seeming mishap is that the numerator intersects the situation, b↓c instead of its randomization, p, which would yield a possibility of 0.5. This follows because the context has already been randomized by R1 in transformations (9) or (10). In general, many more transformations and reverse (i.e., inverse) transformations would be explored.

$$
\begin{aligned}
C1: & \ \frac{|\{pr\} \cap \{b{\downarrow}cw\}|}{|\{pr\} \cup \{b{\downarrow}cw\}|} = \frac{|\{\}|}{|\{prb{\downarrow}cw\}|} = 0 \\
C2: & \ \frac{|\{pr\} \cap \{b{\downarrow}cf\}|}{|\{pr\} \cup \{b{\downarrow}cf\}|} = \frac{|\{\}|}{|\{prb{\downarrow}cf\}|} = 0 \\
C3: & \ \frac{|\{pr\} \cap \{b{\uparrow}c\}|}{|\{pr\} \cup \{b{\uparrow}c\}|} = \frac{|\{\}|}{|\{prb{\uparrow}c\}|} = 0 \\
R1: & \ \frac{|\{pr\} \cap \{b{\downarrow}c\}|}{|\{pr\} \cup \{b{\downarrow}c\}|} = \frac{|\{\}|}{|\{prb{\downarrow}c\}|} = 0 \\
R2: & \ \frac{|\{pr\} \cap \{pw\}|}{|\{pr\} \cup \{pw\}|} = \frac{|\{p\}|}{|\{prw\}|} = 0.333 \\
R3: & \ \frac{|\{pr\} \cap \{pf\}|}{|\{pr\} \cup \{pf\}|} = \frac{|\{p\}|}{|\{prf\}|} = 0.333 \\
R4: & \ \frac{|\{pr\} \cap \{b{\downarrow}l\}|}{|\{pr\} \cup \{b{\downarrow}l\}|} = \frac{|\{\}|}{|\{prb{\downarrow}l\}|} = 0 \\
R5: & \ \frac{|\{pr\} \cap \{p\}|}{|\{pr\} \cup \{p\}|} = \frac{|\{p\}|}{|\{pr\}|} = 0.5
\end{aligned}
\quad (12)
$$

A system implementing method 10 has the capability to mimic biological learners because, at the higher levels at least, biological learners function through the iterative transformation of our internal representations of knowledge. The manner in which biological learners do this is unknown at the functional level. It is only known to occur through post-tetanic potentiation at the neuronal level.

Method 10 can match fuzzy predicates, generate questions/queries to elicit needed information, segment knowledge on the basis of domain specificity, autonomously transfer knowledge between domain-specific segments, generate interrupts and squelches, and evaluate its own learning performance through the use of cumulative possibilities. Again, this is because of its capability for self-referential transformation. This somewhat abstract theoretical capability cannot simply be cursorily dismissed. Not only does it serve as the foundation for computability theory, but by definition must segregate intelligent from trivial non-scalable behaviors.

Each segment will maintain a local stacking mechanism for excluding cycles in transformation. This will be accomplished by checking for duplicate states whenever a transformed context (and transform) is to be stacked. Cases and/or rules, in distinct segments, may act upon the same (transformed) context at any time. The final results of such locally acyclic (successful) transformations are checked against the contents of every segment to ensure that they are unknown. The cases and/or rules are acquired by the most-cohesive segment(s) (see relations (13) and (14) below) in the event that they are globally unknown.

Otherwise, the duplicate state is popped (expunged) from the local stack. Moreover, the entire local stack is cleared to minimize the chance of revisiting this duplicate state. Logically moved rules are allowed to remain as placed as they serve to anneal the symmetric list. Any transform, which gave rise to a duplicate state, is logically moved to the tail of its containing segment to minimize the chance of a recurrence. The stacking mechanism is terminated upon interrupt. Again, duplicate states are checked for whenever a transformed context is to be stacked. This ensures that the transformative sequence is acyclic. It also precludes redundancies from unnecessarily increasing the length of transformation. This would result in an unwarranted reduction in the true possibility of the result.

Figure 2:
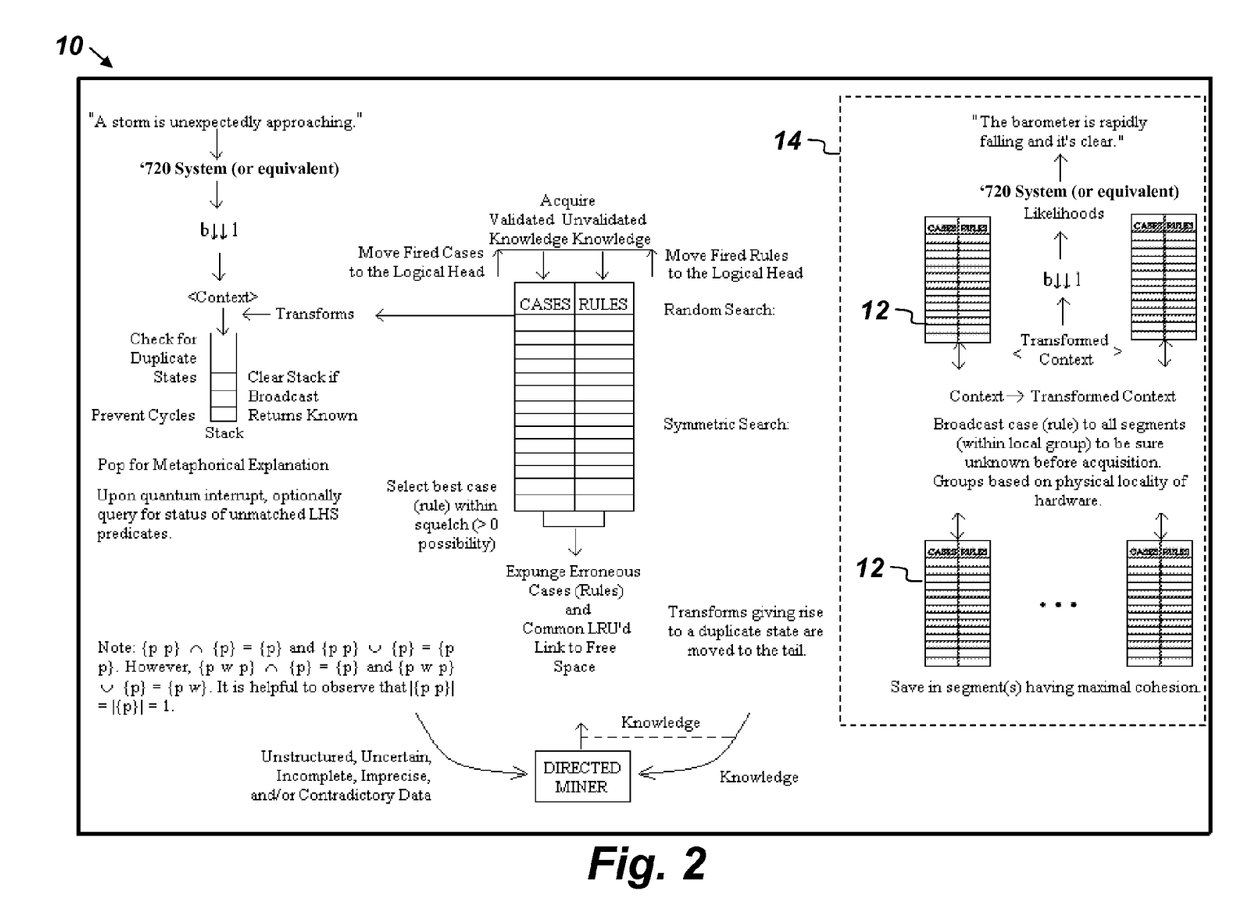
FIG. 2 is a graphical and textual illustration of method 10.

FIG. 2 is a graphical and textual illustration of method 10. As shown, cases and/or rules need to be stored in cohesive units—called segments 12. A segment is assigned one or more co-processors. Moreover, segments are integrated into groups 14. For example, one segment might contain cases and rules for predicting the weather, another might contain cases and rules for planning a mission, and still another might contain knowledge pertaining to appropriate combinations of sensors to deploy. The weather-prediction segment can form a group with the mission-planning segment and/or the sensor-deployment segment.

Successful randomization requires that cases and/or rules be segmented on the basis of shared predicates. Here, no distinction is to be made between LHS and RHS predicates as a result of duality. Sometimes knowledge can be transferred (e.g., by analogy) between segments. Such transference is far more likely to occur when the segments reside in the same group (i.e., direct or one-step transference).

LRU cases and/or rules are expunged to free space as needed. If the cases and/or rules are maintained together in a linked list in each segment, then the case and/or rule of minimal utility will be first to be expunged. This is because the determination of a cases and/or rules relative frequency of use within a segment is compatible with that for other resident cases and/or rules in the same segment. Moreover, the likelihood of evolving (bidirectional non deterministic) productions, which share a common consequent or common antecedent, in the same segment, is then proportionately greater.

Cases and/or rules are to be non-redundantly acquired by all segments having maximal cohesion, where $$\text{cohesion} = \frac{p_{common}}{p_{total}} \tag{13}$$

such that, $p_{common}$ is the number of predicates in the segment, which are in common with the case and/or rule to be acquired and $p_{total}$ is i the total number of predicates in the segment. The cohesion $\in [0,1]$. Zero represents perfect incoherency, while unity represents perfect coherency. The case and/or rule is/are to be acquired by all segments, which have maximal cohesion such that never more than one copy per segment is acquired. Two distinct segments, i and max are said to have maximal cohesion just in case, max has the greatest cohesion, equation (13), and $$\text{cohesion}_i + \delta \geq \text{cohesion}_{max}, \quad 0 \leq \delta \leq 1 \tag{14}$$

for all segments i, where $\delta$ is an appropriately set constant. Setting it to zero minimizes the number of segments that will contain a copy of the case and/or rule; whereas, setting it larger will proportionately increase the redundancy. Every segment will contain a copy of the case and/or rule if $\delta$ is set to unity. The greater the redundancy, the greater the number of symmetric rules that will be induced, but the greater the attendant spatial and temporal inefficiencies as well (e.g., remnants of expunged rules may linger). The case and/or rule is/are to be saved in those segment(s) having maximal cohesion subject to relation (14). In general, $\delta$ should be set to double the total storage requirements from if it were set to zero. This is predicated on well-known results for optimizing the performance of hash tables.

As segments grow, they will eventually fully occupy the local space afforded their processor(s). At this point, if additional segments (i.e., processors) are not available, then the LRU cases and/or rules are expunged to make room for the new cases and/or rules. This approach maximizes segment cohesion by expunging less useful knowledge—thereby preventing the fragmentation of new knowledge to be acquired.

Again, the number of segments may grow too large to enable the previously described exhaustive search for the maximally cohesive segments for the acquisition of a case and/or rule. This is practically due to contention on the bus and/or memory as well as driver limitations. In this event, segments need to be grouped and global search limited to the local groups. Segments should be placed in the same group just in case they share the same or closely related subject matter. The similarity metric for two arbitrary segments, $s_i$ and $s_j$, is computed using a formula that is similar to the formula used to compute the possibility metric in equation (7); namely, $$\text{similarity}(i, j) = \frac{|s_i \cap s_j|}{|s_i \cup s_j|}, \tag{15}$$

where similarity $(i,j) \in [0,1]$ with zero representing maximally dissimilar segments and unity representing maximally similar segments. Segments should be grouped to maximize the similarity between each pairing of segments in each group. There are $O(n^2)$ such pairs, where n is the number of segments. This is the complexity if groups are limited to two segments each. If that limit is raised to three segments each, then the number of combinations is given by $$\frac{n!}{r!(n-r)!} = \frac{n(n-1)(n-2)}{6},$$

where r is the number of segments in a group. This is of $O(n^3)$ complexity and so on for higher-order groups. It clearly implies the need for a heuristic means to accomplish grouping in practice.

Thus, groups are determined on the basis of physical locality. That is, the physical distance separating an arbitrary pair of processors needs to be weighted by the frequency of communication between them. This is done to minimize the mean latency. The number of segments in a group is determined by the number of processors and the capability for concurrent search among them. Very large systems may incorporate the physical migration of segments into groups. The graphical illustration of the embodiment of method 10 depicted in FIG. 2 is presented below in algorithmic form.

A. Context-Sensitive Learning
  1. Create a shared symbolic predicate interpretation lookup table in each segment. This includes primitive symbols and their sequences, LHS, and RHS interpretations (See Table 1).

B. On Heuristically Speeding-Up the Mining of Knowledge
  2. Heterogeneous state variables provide an initial context.
  3. Define random and symmetric quantums for each processor.
  4. The random/symmetric quantum is the exclusive time spent in performing random/symmetric search in the most recent successful rule discovery, per processor.
  5. Initialize both quantums to the same value so as to preserve fairness and prevent thrashing.
  6. Initialize search using the random quantum.
  7. Search is terminated, prior to quantum expiration, if no production is found to be applicable.
  8. Search in each processor alternates—proportionately favoring the modality having the shorter quantum. Break ties at uniform chance.

9. Apply cases and/or rules to the (resultant) context, where a successful result updates the quantums. Success implies that the (transformed) context covers (or fuzzily matches upon interrupt) a situation in some processor, where the possibility is within squelch.
10. Successfully fired cases and/or rules are logically moved to the head of their processor list.
11. Productions are uniformly chosen to operate left to right without loss of generality.
12. Productions are chosen at uniform chance in random transformation.
13. Productions need not only be applicable, but must reduce the distance between the context and at least one situation in the case and/or rule base in symmetric transformation. That is, the current maximum one-step possibility, equation (7), must increase over all segments after the application of each symmetric transform. The test for the applicability of these transforms progresses down from a segments logical head.

C. Matching Uncertain, Incomplete, Imprecise, and/or Contradictory Datasets

14. If upon timer/quantum interrupt, a complete covering of a situation in a segment is not found, take the cases and/or rules having the highest one-step possibilities, equation (7), and issue questions/queries, if appropriate, as to the status of their unmatched situational predicates.
15. The logically highest situation, in a segment, is the best match for the context in the event of a tie.
16. The final case and/or rule must have greater than a zero possibility (and be within squelch) to be applied.
17. The possibility of a sequence of transforms is the product of the possibility of each transform in the sequence.
18. If an action has more than one associated possibility, the greatest possibility is the one ascribed.
19. Actions are presented, to the user, in non-increasing order of their possibilities within squelch.
20. Possibilities may be translated into likelihoods (Table 2).
21. Note: $\{p\ p\} \cap \{p\} = \{p\}$ and $\{p\ p\} \cup \{p\} = \{p\ p\}$. However, $\{p\ w\ p\} \cap \{p\} = \{p\}$ and $\{p\ w\ p\} \cup \{p\} = \{p\ w\}$. It is helpful to observe that $|\{p\ p\}| = |\{p\}| = 1$.
22. All cases and/or rules found to be in error are expunged and/or (more-specific) correct cases and/or rules are acquired, where the corrections are known. The randomized actions are paired with the original supplied context. They are acquired at the logical head of the segment(s) having maximal cohesion, equation (13). The case and/or rule is to be saved in those segment(s) having maximal cohesion subject to relation (14). In general, ($\delta$ should be set to double the total storage requirements from if it were set to zero.
23. The LRU cases and/or rules, in a segment, are expunged to free storage space, as necessary.

D. On Parallel Processing

24. Each segment maintains a local stacking mechanism for excluding cycles in transformation by checking for duplicate states whenever a transformed context (and transform) is to be stacked.
25. The final results of such locally acyclic (successful) transformations are checked against the contents of every segment (segment local to its group) to insure that it is unknown.
26. The case and/or rule is acquired by the most-cohesive segment(s), relations (13) (14), in the event that it is locally unknown.
27. Otherwise, the entire local stack is cleared.
28. Any transform, which gave rise to a duplicate state, is logically moved to the tail of its containing segment.
29. Terminate the stacking mechanism upon interrupt, or failure to find a (further) randomization within cumulative squelch.
30. The acyclic contexts, transformations, and transformed contexts, on the segment stacks, serve as sequential metaphorical explanations.

E. Distributed Segmentation

31. Cases and rules are separately linked in each segment though they share a common LRU link to free space.
32. Groups are determined by collecting maximally similar segments. This may be dynamically determined on the heuristic basis of physical locality.
33. The number of segments in a group is determined by the number of processors and the capability for concurrent search among them.
34. Very large systems may incorporate the physical migration of segments into groups.

Method 10 may be considered a system of systems that puts forth that heuristics are needed to scale the knowledge bases that are needed to scale data mining to unprecedented levels. Method 10 tests a representation for heuristics using an annealed transformative search that is based on randomness and symmetry. It then follows that such an approach to heuristic generation must be self-referential. The knowledge bases are segmented to enable massively parallel processing (initially simulated). Also, this allows for like knowledge to be grouped together. This means that a geometric pattern of processors will evolve for addressing certain problems (just as the brain has specific areas for performing specific functions).

Heuristics represent a condensation of the domain-specific knowledge embodied in minimizing the complexity of the search paradigm. This knowledge must, by definition, include heuristics in general. This inclusion is necessary for a mathematical fixed point to arise, which in the case of an indefinite sequence has a random sequence as the image of its randomization. It follows that in general there can be no such thing as logics for discovery—only heuristic search, including heuristics for discovering heuristics, ad infinitum, until a domain-specific fixed point is reached.

Heuristic acquisition is inherent to any non-trivial randomization of knowledge. Let, $f$ be a total computable search function, which maps an arbitrary context, c, to an arbitrary case antecedent, a, where c and a are state vectors. Maps are differentiated from equivalences through the use of implication signs ($\rightarrow$). Then, $$f(c) = \begin{cases} a, & \text{if } \|f(c) - a\| < \delta; \\ NIL, & \text{otherwise.} \end{cases} \quad (16)$$

where the indicated norm defines a qualitatively fuzzy match. Next, let $g(a) \rightarrow b$ and $f(c) \rightarrow h(b)$, where b is an arbitrary state vector; g and h are total computable functions; and, $g^{-1}$ may not substitute for h, where it exists, because $0 < \delta$. Note that the use of the function h in h(b) denotes the case adaptation (randomization) problem, which is as yet unsolved in the open literature for the general case. One may write, $f(c) \rightarrow h(g(a))$, and since g and h are total computable functions, it follows that $$a \rightarrow \begin{cases} k(a), & \text{if } \|f(c) - a\| < \delta; \\ \bot, & \text{otherwise.} \end{cases} \quad (17)$$

where k is the total computable composition, h∘g. Now, where δ is arbitrarily large, one may write, a→k(a), a≠k(a). Next, define F to be a Function of Functions such that F={$f_0$, $f_1, \ldots, f_n$}. It should be clear that one can write, F→g(F), where g is a redefined total computable function. Then, through the use of pairing and projection functions, one may equivalently write, $f$→g($f$), $f$≠g($f$). Observe that, a→$f$(a) and a→g($f$(a)), where $f$ is a redefined total computable function. Thus, it follows that there must be inherent non determinism in a general case adaptation (randomization), since a is arbitrary and $f$≠g($f$). It also follows that the alternatives, selected at random, are equivalent under transformation (i.e., analogous)—under the image of the arbitrary functional, g.

Abduction results when a (transformed) context is fuzzily matched to a situation, which it does not cover and a question/query is issued. Knowledge is segmented to enable parallel processing as well as to maximize coherency and thus maximize the creative problem-solving capability of the system. New knowledge may replace less useful knowledge so as to maximize overall system cohesion. Moreover, the potential for contention on the bus and in memory, in a massively parallel architecture, suggests that segments be arranged into local groups on the basis of physical locality.

Local stacking mechanisms may be used to randomize knowledge. The acyclic sequence of transformations produced can provide metaphorical explanations (with possibilities). These define how the context was changed in matching (firing) a particular situation—implying a particular action, in turn.

From the above description of method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

I claim:

1. A method for directed mining of a heterogeneous dataset with a computer comprising the steps of:
    populating a rule base with known rules, wherein each rule has a context and a situation;
    populating a case base with known cases, wherein each case has a context and a situation, wherein the case base is partitioned from the rule base, and wherein cases and rules are stored in segments so as to increase their domain-specificity across parallel processors;
    ascribing a natural language semantics to predicates of the known cases and rules;
    randomly transforming the known rules and the known cases to form new rules by extracting a maximum number of common predicates;
    segmenting the rules and the cases on the basis of shared predicates without making distinction between context and situation predicates;
    abducing new knowledge from the dataset by fuzzily matching the context of a new rule to a situation the new rule does not cover;
    calculating a relative possibility (i) for a given situation and a given context such that the $$\text{possibility}(i) = \frac{|\text{context} \cap \text{situation}_i|}{|\text{context} \cap \text{situation}_1|},$$

wherein the possibility (i) ∈[0,1];
    discarding new rules that have a possibility below a possibility squelch threshold;
    wherein for a given processor random and symmetric quantum values are dynamically defined, wherein the random quantum defines the amount of time that the given processor may spend in the performance of random search for new knowledge and the symmetric quantum defines the amount of time that the given processor may spend in the performance of symmetric search for new knowledge; and
    issuing a query to a user to supply missing predicates of the fuzzy match.

2. The method of claim 1, further comprising iteratively mapping the dataset with a learning, natural-language-processing system to yield generalized qualitative descriptors to replace natural language contexts and situations.

3. The method of claim 1, further comprising the step of providing a metaphorical explanation for each new rule by providing a description of the sequence of transformations that led to the new rule.

4. The method of claim 1, further comprising the steps of:
    initializing search using the random quantum;
    terminating the search prior to quantum expiration, if no production is found to be applicable;
    searching in each processor for alternates—proportionately favoring either random or symmetric search depending on which has the shorter quantum; and
    updating the quantum values if a new transformed context covers, or fuzzily matches upon interrupt, any given situation in any given processor, where the possibility of the combination of the new transformed context and the given situation is within the possibility squelch.

5. The method of claim 4, further comprising the step of querying for the status of unmatched context predicates upon a quantum interrupt.

6. The method of claim 1, further comprising the step of moving successfully fired cases and rules to a logical head of their respective bases.

7. The method of claim 2, further comprising the step of transforming a user-supplied context into a transformed context by randomizing the qualitative descriptors in the user-supplied context based on common predicates in the case and rule bases.

8. The method of claim 1, wherein cases and rules are ranked in order of most to least-recently-used (LRU), and wherein the LRU cases and rules are expunged as part of a policy to maximize coherency of each segment.

9. The method of claim 1, wherein segments and processors are sub-divided into logical groups that are based on physical locality and migrated using relaxation techniques.

10. A method for directed mining of a heterogeneous dataset comprising the steps of:
    dividing the dataset into domain-specific segments, each segment stored on a separate processor, wherein each segment comprises case productions and rule productions that are partitioned into rule and case bases, and wherein each production comprises a context predicated by a situation and vice versa;
    creating a shared symbolic predicate interpretation lookup table in each segment that includes primitive symbols and their sequences, context, and situation interpretations;

searching a segment by selecting a given production and transforming it by replacing its context with predicate equivalents and then searching the group of segments for a situation covered by the transformed context;

defining random and symmetric quantums for each processor, wherein the random and symmetric quantums represent the exclusive time spent in performing random and symmetric searches respectively in a most-recently-successful rule discovery, per processor;

initializing both quantums in each processor to the same value so as to preserve fairness and prevent thrashing;

terminating search prior to quantum expiration if no situation is found to be applicable;

alternating search in each processor between symmetric and random search proportionately favoring the type of search having the shorter quantum, wherein ties are broken at uniform chance;

updating the quantums if the transformed context covers, or fuzzily matches upon interrupt, a given situation in one of the processors and if a likelihood of the combination of the transformed context and the given situation is within a possibility squelch, wherein the possibility of the combination of the transformed context and the given situation is the product of the possibility of each transform in the combination;

adding the transformed context and the covered situation as a new rule to the logical head of the rule base of those segment(s) having maximal cohesion subject to relation;

taking the cases and/or rules having the highest one-step possibilities, and issuing questions/queries to a user as to the status of their unmatched situational predicates if upon timer/quantum interrupt, a complete covering of a situation in a segment is not found;

expunging all cases and rules that are found to be in error;

expunging the least-recently-used (LRU) cases and rules in a segment to free storage space as necessary;

maintaining in each segment a local stacking mechanism for excluding cycles in transformation by checking for duplicate states whenever a transformed context and transform is to be stacked;

checking the final results of locally acyclic and successful transformations against the contents of every segment to insure that it is unknown;

moving to the tail of its containing segment any transform, which gave rise to a duplicate state;

terminating the stacking mechanism upon interrupt, or failure to find a randomization within cumulative likelihood within the possibility squelch; and providing the acyclic contexts, transformations, and transformed contexts, on the segment stacks, as sequential metaphorical explanations.

11. The method of claim 10, wherein the cases and rules are separately linked in each segment though they share a common LRU link to free space.

12. The method of claim 11, wherein groups of segments are determined by collecting maximally similar segment, dynamically determined on the heuristic basis of physical locality.

13. The method of claim 12, wherein the number of segments in a group is determined by the number of processors and the capability for concurrent search among them.

14. The method of claim 13, wherein a transformed context and covered situation need not only be applicable, but must reduce the distance between the context and at least one situation in the case or rule base in symmetric transformation.

* * * * *